United States Patent [19]

Navarro et al.

[11] Patent Number: 5,664,714

[45] Date of Patent: Sep. 9, 1997

[54] VEHICULAR ENTERTAINMENT COMPONENT STAND

[76] Inventors: Jose Navarro, 105-12 Farragut Rd., Brooklyn, N.Y. 11236; Daniel Aponte, 178 Massachusetts Ave., Bay Shore, N.Y. 11706

[21] Appl. No.: 374,113

[22] Filed: Jan. 18, 1995

[51] Int. Cl.$^6$ .................................................. B60R 11/02
[52] U.S. Cl. ........................ 224/275; 224/564; 224/929
[58] Field of Search ........................ 224/275, 42.11, 224/548, 555, 560, 564, 929

[56] References Cited

U.S. PATENT DOCUMENTS

| | | |
|---|---|---|
| 2,790,184 | 4/1957 | Testa ............................ 224/275 X |
| 3,144,272 | 8/1964 | Yadven . |
| 3,436,770 | 4/1969 | Turner . |
| 3,572,562 | 3/1971 | Floyd . |
| 3,630,343 | 12/1971 | Wohl . |
| 3,799,071 | 3/1974 | Gerlach . |
| 3,984,161 | 10/1976 | Johnson ............................ 224/547 X |
| 4,097,012 | 6/1978 | McIntyre ............................ 224/547 X |
| 4,560,096 | 12/1985 | Lucas et al. . |
| 4,659,099 | 4/1987 | Malone ............................ 224/275 X |
| 5,033,709 | 7/1991 | Yuen ............................ 224/929 |
| 5,106,153 | 4/1992 | Durling . |
| 5,253,791 | 10/1993 | Chiodo ............................ 224/275 |
| 5,342,111 | 8/1994 | Charles . |
| 5,397,160 | 3/1995 | Landry ............................ 224/929 |

*Primary Examiner*—Renee S. Luebke
*Attorney, Agent, or Firm*—Galgano & Burke

[57] ABSTRACT

A stand, particularly suited for use within a vehicle, engages two spaced armrests in order to support an electronic entertainment component, such as a television. The stand comprises a support surface, at least one attachment member for attaching an entertainment device to the support surface and members for releasably securing the support surface to two separate vehicular armrests.

24 Claims, 3 Drawing Sheets

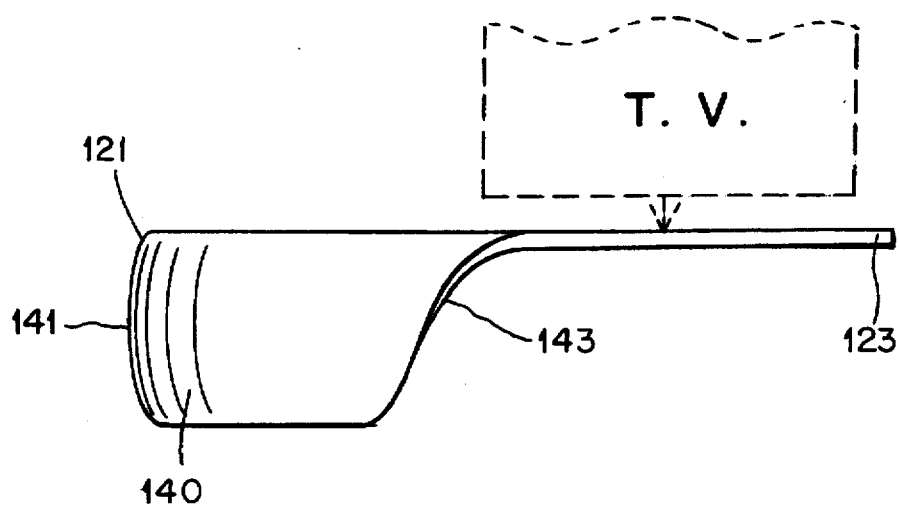
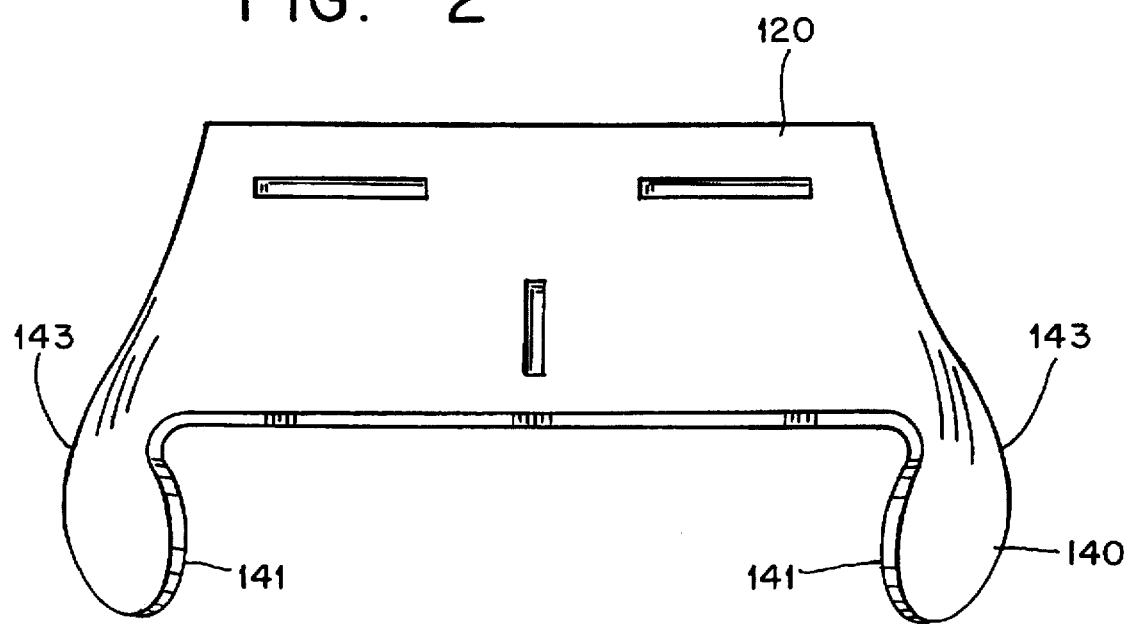

VEHICULAR ENTERTAINMENT COMPONENT STAND

The present invention is directed to a stand for an entertainment component and, more particularly, to a stand designed to be supported by two separate seat arms inside a vehicle.

BACKGROUND OF THE INVENTION

Since cars were first mass produced, people have been working on ways of making riding in cars and other vehicles more enjoyable. With the advent of modern electronics, such as radios, televisions, VCRs and CD players, people have found various ways of mounting electronic components within the interior of a vehicle. While many electronic component installations are designed to be of a permanent nature, the risk of loss through theft has increased the desirability of providing a mounting system which is readily removable by the vehicle owner when the vehicle is not occupied.

In addition to providing a mounting mechanism which allows quick removal of the component, it is also particularly desirable to provide a mounting system which provides ready access to the component. In the case of a television or video game, it is also necessary that the electronic component be in a position which is readily visible by the vehicle occupants during use.

Since many previously disclosed vehicle mounting systems for televisions, VCRs have been of a permanent or semi-permanent nature, it would be desirable to provide a vehicular component stand which is both readily visible by the vehicle occupants and which is readily removable.

Furthermore, it would be particularly desirable to provide a vehicular entertainment component stand which can be manufactured quickly and at relatively low cost.

SUMMARY OF THE INVENTION

The present invention is directed to a vehicular entertainment component stand designed to be supported by two separate vehicular seat armrests. For example, those familiar with minivans and sports utility vehicles will readily appreciate that many such vehicles are provided with bucket seats or captain's chairs having armrests. The present invention is designed to engage two separate vehicular seat armrests and to support an electronic entertainment component, such as a television.

One preferred embodiment of the present invention comprises a support surface, means for attaching an entertainment device to the support surface, and means for releasably securing the support surface to two separate vehicular seat armrests. In a preferred embodiment, the support surface and securing means are integrally formed of a polymeric material, such as plexiglass or Lexan™.

According to another preferred embodiment of the present invention, a beverage tray is movably mounted below the support surface.

These and other embodiments are described below with reference to the figures.

BRIEF DESCRIPTION OF THE DRAWINGS

FIG. 2 is a front, perspective view of an alternative embodiment of the present invention.

FIG. 3 is a side view of the embodiment shown in FIG. 2 with a television shown in phantom.

DETAILED DESCRIPTION

The present invention advantageously provides a entertainment support stand for use with a wide variety of modern vehicles which comprise separate seat armrests. The various embodiments of the present invention comprise a support surface, means for attaching an entertainment device to the support surface, and means for releasably securing the support surface to two separate vehicular seat armrests. The term "vehicle" is used herein in its broad sense to include any passenger carrying means of transportation including motor vehicles, planes, boats, and the like. From the present description, while it will be appreciated that the present invention is particularly useful for minivans, sport utility vehicles and campers, the present invention can also be utilized advantageously with other modes of transportation.

Figure 1:
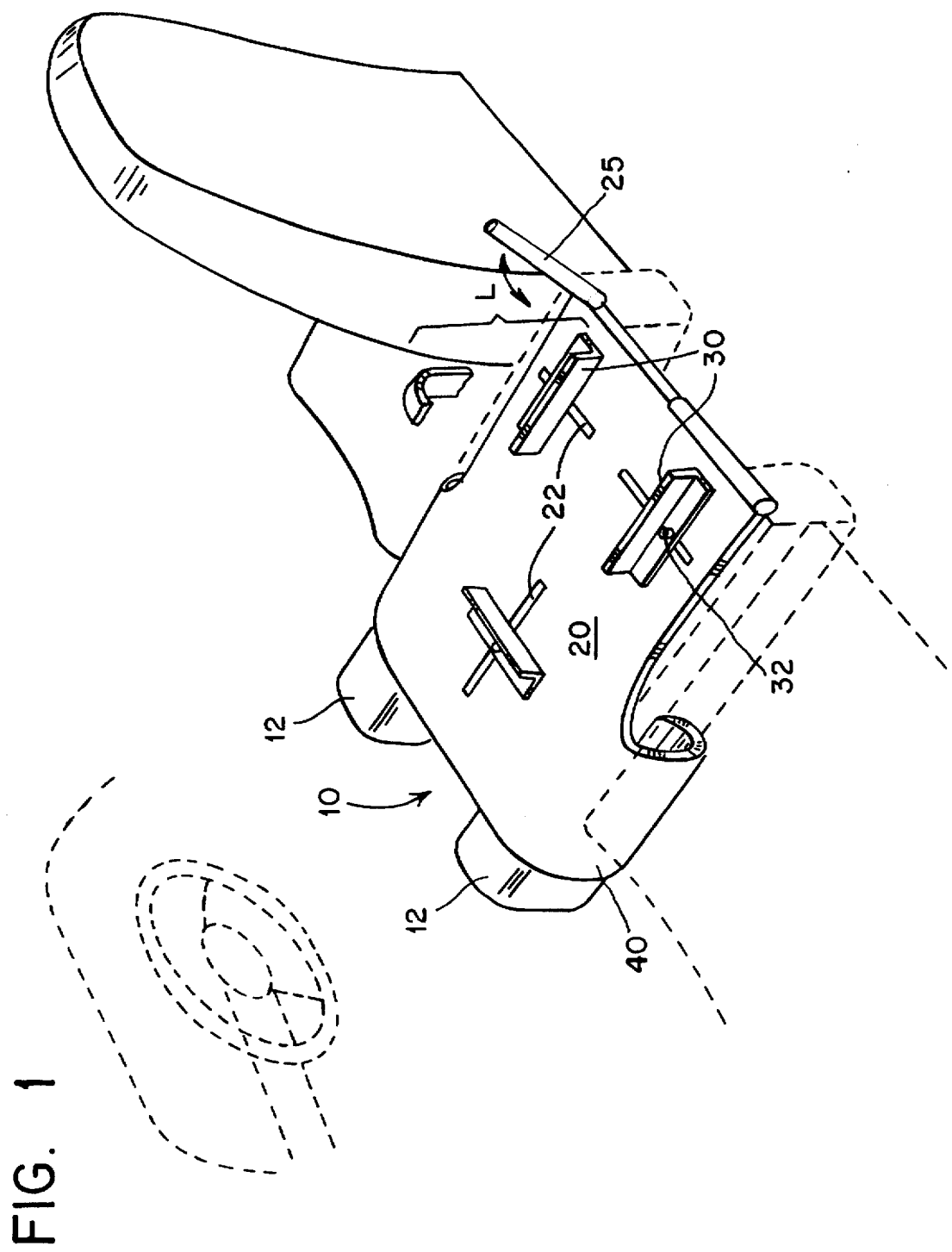
FIG. 1 is a perspective view of one embodiment of the present invention positioned between two vehicular seats (shown in phantom).
Figure 4:
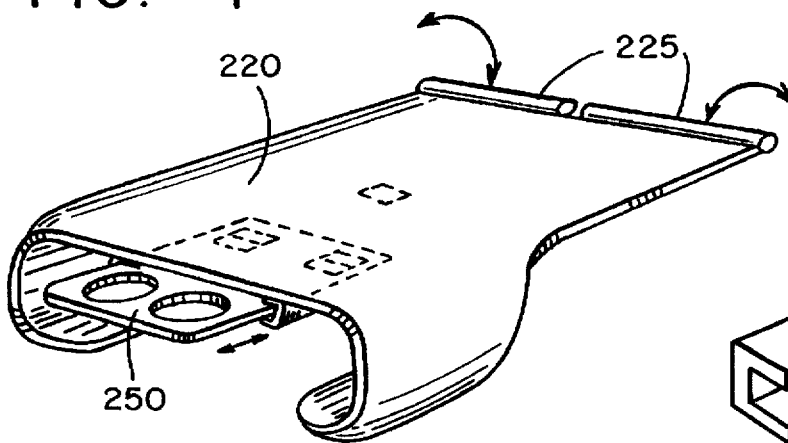
FIG. 4 is a perspective view of an alternative embodiment of the present invention.
Figure 8:
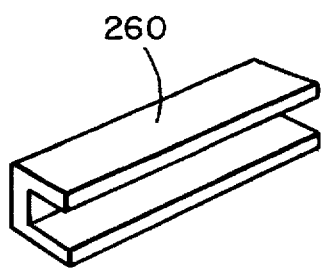
FIG. 8 is a perspective view of a channel used for mounting the beverage tray shown in FIG. 5.
Figure 6:
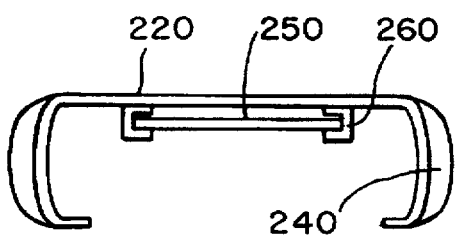
FIG. 6 is a front view of the embodiment shown in FIG. 4.
Figure 5:
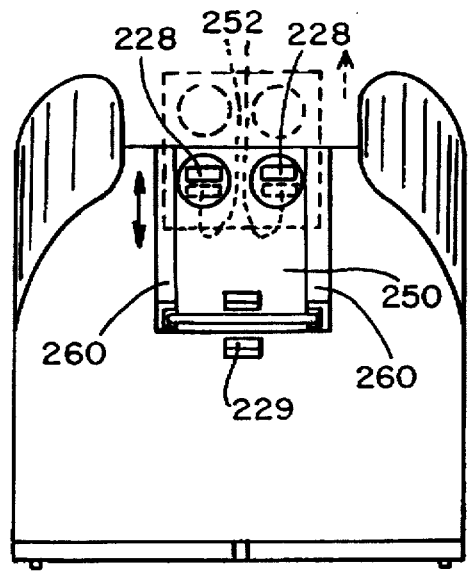
FIG. 5 is a bottom view of the embodiment illustrated in FIG. 4.
Figure 7:
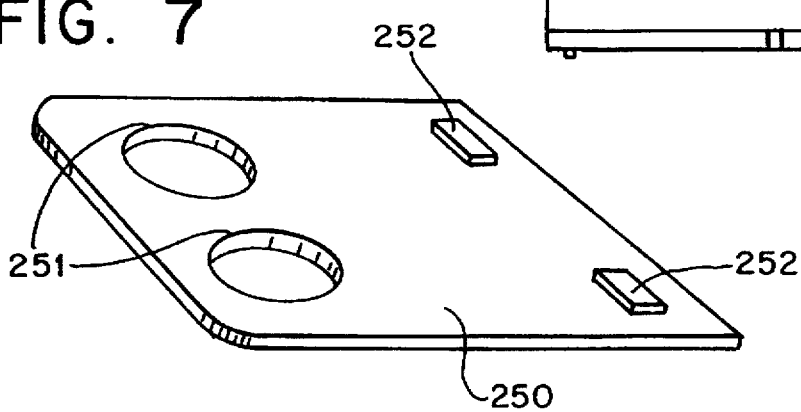
FIG. 7 is a top view of a beverage tray for use with the embodiment shown in FIG. 4.

One embodiment of the present invention is illustrated in FIG. 1. This embodiment is in the form of a television stand 10. While the various embodiments of the present invention will be illustrated in the form of television stands, it will also be appreciated that other entertainment devices such as video games, compact disk players, radios and the like, may also be utilized with the disclosed stands without departing from the scope of the present invention. FIG. 1 illustrates the manner in which stand 10 is supported by armrests 12 which are disposed in spaced relation. The stand 10 comprises a support surface 20, attachment members 30 for attaching a television or other entertainment component to support surface 20, and securing members 40 for releasably securing the support surface 20 to the armrests 12. According to this preferred illustrated embodiment, the support surface 12 and securing members 40 are integrally formed of a polymeric material. While a wide variety of materials may be suitable, polymeric material such as plexiglass and Lexan™ may be particularly desirable due to their durability, cost effectiveness and relative ease to manufacture. While the illustrated embodiment comprises securing members 40 which are integrally formed with support surface 20, it is also within the scope of the present invention to provide separate securing members which can be attached to a support surface during manufacturing or prior to installation within a vehicle.

Attachment members 30 of this illustrated embodiment of the present invention comprise generally L-shaped flanges which receive threaded fasteners 32 which pass through slots 22 in support surface 20. Fasteners 32 may be in the form of bolts or wing nuts and are preferably designed to allow tightening and loosening by hand, i.e. without requiring a separate tool. When fasteners 32 are loosened, attachment members 30 can be moved within slots 22 in order to position the entertainment component on support surface 20 and to bring the attachment members 30 into engagement with the entertainment component. The fasteners 32 are then preferably tightened in order to lock the attachment members into place. In the illustrated embodiment, three attachment members 30 are provided in order to securely engage both sides of the entertainment component as well as the back of the entertainment component. For example, a television can be secured to support surface 20 that the television faces the back seat (not shown) of the vehicle for viewing by passengers in the rear seats. The television will be secured on its sides and on the rearward portion thereof to prevent shifting when the vehicle is in motion.

While the illustrated attachment members provide one manner of securing the television or other entertainment device to the support surface, it will be appreciated that other forms of attachment members may be utilized without departing from the scope of the present invention. For example, it may be particularly desirable to provide attachment members which extend at least partially over the top of the entertainment component in order to prevent detachment during use or while the vehicle is moving.

According to the preferred illustrated embodiments of the present invention, the stand 10 is designed to be attached to two separate armrests by positioning the stand forwardly of the armrests with the support surface slightly above the top surfaces of the armrests and the attachment members 40 positioned forwardly of the forward ends of the armrests 12, i.e. closer to the forward end of the vehicle. The stand is then moved rearwardly thereby sliding the attachment members 40 over and most preferably around the armrests 12.

According to another preferred aspect of the present invention, once the stand has been positioned over the armrests and slid rearwardly so that the attachment members securely engage the armrests, a pivotal locking bar 25 which is rotatably connected to the rear portion of support surface 20 is advantageously rotated to a position behind the vehicular seats. Locking arms 25 which are pivotally connected to the support surface for rotation about an arc L will provide additional protection by preventing the stand 10 from shifting forwardly during a short stop.

FIGS. 2 and 3 illustrate the support surface and attachment members of an alternative embodiment of the present invention. In this illustrated embodiment, the attachment members 140 are not as curved as the attachment members 40 of the embodiment shown in FIG. 1. The support surface 120 comprises a forward end 121 and a rearward end 123. As shown more clearly in this embodiment, the forward ends 141 of attachment members 140 are spaced more closely than the rearward ends 143. The attachment members 140 thereby taper outwardly from the front portion of the stand toward the rear of the stand. In this manner, when the stand is slid rearwardly over vehicular armrests, the gradual taper of the attachment members 140 will more securely engage the armrests.

Another embodiment of the present invention is illustrated in FIGS. 4 through 8. According to this embodiment, a beverage tray 250 is slidably mounted below the support surface 220. In this illustrated embodiment, beverage tray 250 comprises cutouts 251 for receiving beverage containers and stops 252. As shown in the bottom view of FIG. 5, beverage tray 250 is mounted for sliding movement on the bottom of the illustrated stand, generally at a lower level than support surface 220. Beverage tray 250 is held in place by opposing channels 260. The forward movement of beverage tray 250 is limited by stops 252 on the beverage tray 250 which engage corresponding stops 228 which are connected to the body of the stand. In a similar fashion, the rearward movement of beverage tray 250 is limited by a rearward stop 229 which is also connected to the bottom surface of the body of the stand. The embodiment illustrated in FIGS. 4 through 8 also comprises pivotal locking arms 225 for preventing undesired forward slippage of the stand after the stand has been positioned relative to the armrests.

While the illustrated embodiments of the present invention provide a support surface which is positioned above the armrests to which the stand will be connected, it is also within the scope of the present invention to provide a stand having a support surface which is positioned below the upper surface of the armrests.

What is claimed is:

1. A vehicular entertainment stand comprising:
  a support surface;
  means for adjustably attaching an entertainment device to said support surface; and
  means for releasably securing said support surface to two separate vehicular armrests.

2. A vehicular entertainment stand according to claim 1 wherein said securing means are connected to opposite sides of said support surface for supporting an entertainment device between two separate vehicular armrests.

3. A vehicular entertainment stand according to claim 2 wherein said securing means also extend below said support surface for supporting said entertainment device above said separate vehicular armrests.

4. A vehicular entertainment stand according to claim 1 wherein said securing means comprises two curved engagement members engaging separate vehicular armrests.

5. A vehicular entertainment stand according to claim 4 wherein each of said engagement members wraps around at least one side and a portion of a bottom surface of a vehicular armrest.

6. A vehicular entertainment stand according to claim 1 wherein said securing means is integrally formed with said support surface.

7. A vehicular entertainment stand according to claim 6 wherein said support surface and said securing means comprise a polymeric material.

8. A vehicular entertainment stand according to claim 1 wherein said securing means comprises tapered surfaces which are closer at a first position than at a second position, whereby as said tapered surfaces of said securing means are slid onto two separate vehicular armrests, said securing means will engage said armrests more securely proximate said first position than said second position.

9. A vehicular entertainment stand according to claim 1 further comprising a beverage tray connected to said support surface.

10. A vehicular entertainment stand according to claim 9 wherein said beverage tray is movably mounted below said support surface.

11. A vehicular entertainment stand according to claim 1 wherein said attaching means comprises at least two laterally opposing generally L-shaped adjustable flanges which are slideably secured by way of a fastening device within a slot formed within said support surface such that, when said fastening device is loose, said flanges are slideably positioned to abut against said entertainment device and then tightened thereby locking said flanges in place and securing said entertainment device.

12. A vehicular entertainment stand according to claim 1 wherein said securing means comprises an engagement member which extends below a portion of a bottom surface of a vehicular armrest.

13. A vehicular entertainment stand according to claim 1 further comprising means for preventing said stand from shifting relative to said vehicular armrests.

14. A vehicular entertainment stand according to claim 1 further comprising means for holding a beverage container.

15. A vehicular entertainment stand according to claim 1 wherein said attaching means extends at least partially over a top portion of an entertainment component.

16. A vehicular entertainment stand comprising:

a substantially planar support surface;

means for attaching an entertainment device to said support surface; and means for releasably securing said support surface to two separate vehicular armrests, wherein said securing means are connected to opposite sides of said support surface for supporting an entertainment device between said two separate vehicular armrests, and wherein said securing means also extend below said support surface for supporting said entertainment device above said separate vehicular armrests.

17. A vehicular entertainment stand according to claim 16 further comprising means for preventing said stand from shifting relative to said vehicular armrests.

18. A vehicular entertainment stand according to claim 16 further comprising means for holding a beverage container.

19. A vehicular entertainment stand comprising:

a substantially planar support surface;

means for attaching an entertainment device to said support surface; and means for releasably securing said support surface to two separate vehicular armrests, wherein said securing means comprises an engagement member which extends below a portion of a bottom surface of a vehicular armrest.

20. A vehicular entertainment stand comprising:

a support surface;

means for attaching an entertainment device to said support surface; and means for releasably securing said support surface to two separate vehicular armrests, said securing means comprising two curved engagement members engaging separate vehicular armrests wherein each of said engagement members wraps around at least one side and a portion of a bottom surface of a vehicular armrest.

21. A vehicular entertainment stand comprising:

a support surface;

means for attaching an entertainment device to said support surface;

means for releasably securing said support surface to two separate vehicular armrests; and a beverage tray connected to said support surface wherein said beverage tray is movably mounted below said support surface.

22. A vehicular entertainment stand comprising:

a support surface;

means for attaching an entertainment device to said support surface; and means for releasably securing said support surface to two separate vehicular armrests, said securing means comprising tapered surfaces which are closer at a first position than at a second position, whereby as said tapered surfaces of said securing means are slid onto two separate vehicular armrests, said securing means will engage said vehicular armrests more securely proximate said first position than said second position.

23. A vehicular entertainment stand comprising:

a support surface;

means for attaching an entertainment device to said support surface, said attaching means comprising at least two laterally opposing generally L-shaped adjustable flanges which are slideably secured by way of a fastening device within a slot formed within said support surface such that, when said fastening device is loose, said flanges are slideably positioned to abut against said entertainment device and then tightened thereby locking said flanges in place and securing said entertainment device; and means for releasably securing said support surface to two separate vehicular armrests.

24. A vehicular entertainment stand comprising:

a substantially planar support surface;

means for attaching an entertainment device to said support surface; and means for releasably securing said support surface to two separate vehicular armrests, wherein said attaching means extends at least partially over a top portion of an entertainment component.

* * * * *